(12) United States Patent
Dolph

(10) Patent No.: US 6,240,648 B1
(45) Date of Patent: Jun. 5, 2001

(54) METHOD AND APPARATUS FOR PERFORMING REAR WHEEL ALIGNMENT ON MOTORCYCLES HAVING A SWING ARM REAR SUSPENSION SYSTEMS

(76) Inventor: Daniel E. Dolph, 3716 Sue La. NW., Cedar Rapids, IA (US) 52405

( * ) Notice: Subject to any disclaimer, the term of this patent is extended or adjusted under 35 U.S.C. 154(b) by 0 days.

(21) Appl. No.: 09/273,408

(22) Filed: Mar. 22, 1999

(51) Int. Cl.[7] .............................. G01B 5/255; B62M 9/16
(52) U.S. Cl. ........................ 33/203.18; 33/600; 33/645; 33/677; 33/678
(58) Field of Search .................. 33/203, 18.1, 27.01, 33/27.02, 27.03, 27.031, 483, 484, 485, 489, 490, 810, 811, 832, 203.18, 600, 613, 645, 666, 676, 677, 678

(56) References Cited

U.S. PATENT DOCUMENTS

| 4,616,418 | * | 10/1986 | Wade, III | 33/27.03 |
| 5,027,524 | * | 7/1991 | Metcalf et al. | 33/203.18 |
| 5,546,665 | * | 8/1996 | Jackmauh | 33/203 |
| 5,655,310 | * | 8/1997 | Lawshea, Jr. et al. | 33/600 |

OTHER PUBLICATIONS

Prior art published repair manual, (Date Unknown).

* cited by examiner

*Primary Examiner*—Christopher W. Fulton
(74) *Attorney, Agent, or Firm*—Simmons, Perrine, Albright & Ellwood PLC

(57) ABSTRACT

A method and apparatus for improving rear wheel alignments for motorcycles having a swing arm suspension including a measuring rod for extending between a swing arm bolt or shaft and a rear axle of the motorcycle, a measuring rod having an end thereon for mechanically coupling with the swing arm bolt or shaft or a nut or other device coupled to the swing arm shaft or bolt so that the measuring rod is registered at a predetermined position with respect to the pivot shaft and further including a marker for marking a position along the measuring rod of a predetermined position of the rear axle of the motorcycle.

20 Claims, 3 Drawing Sheets

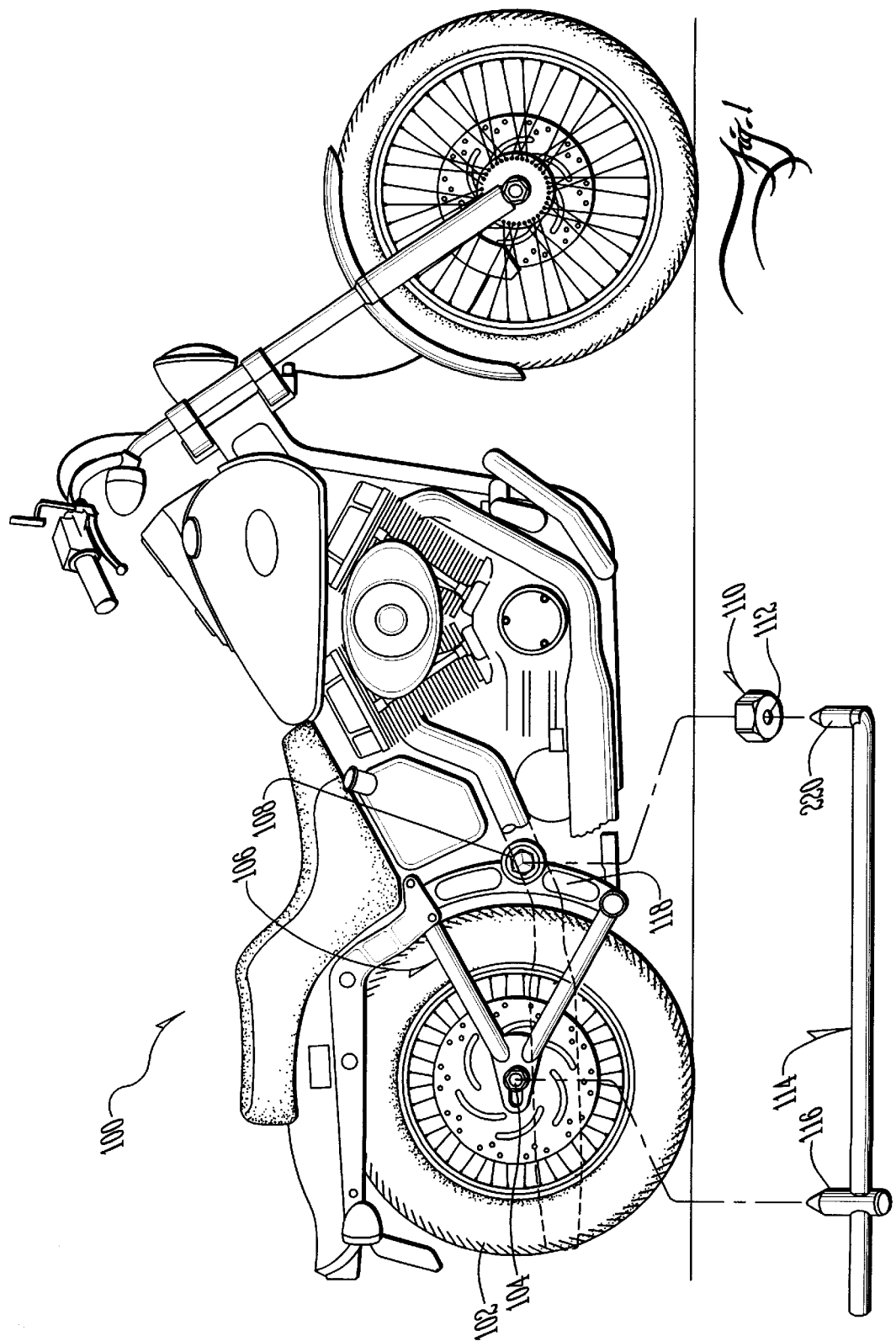

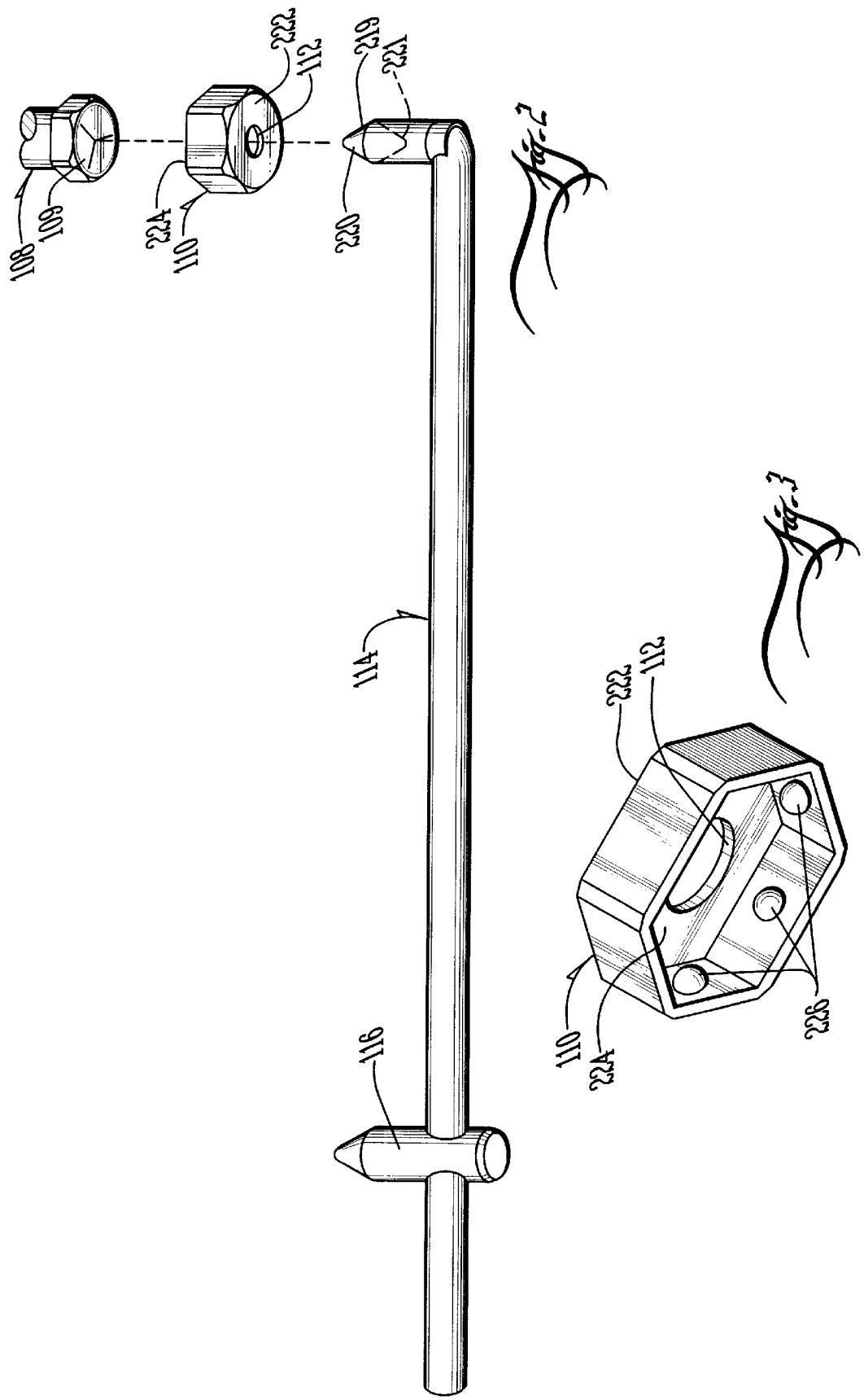

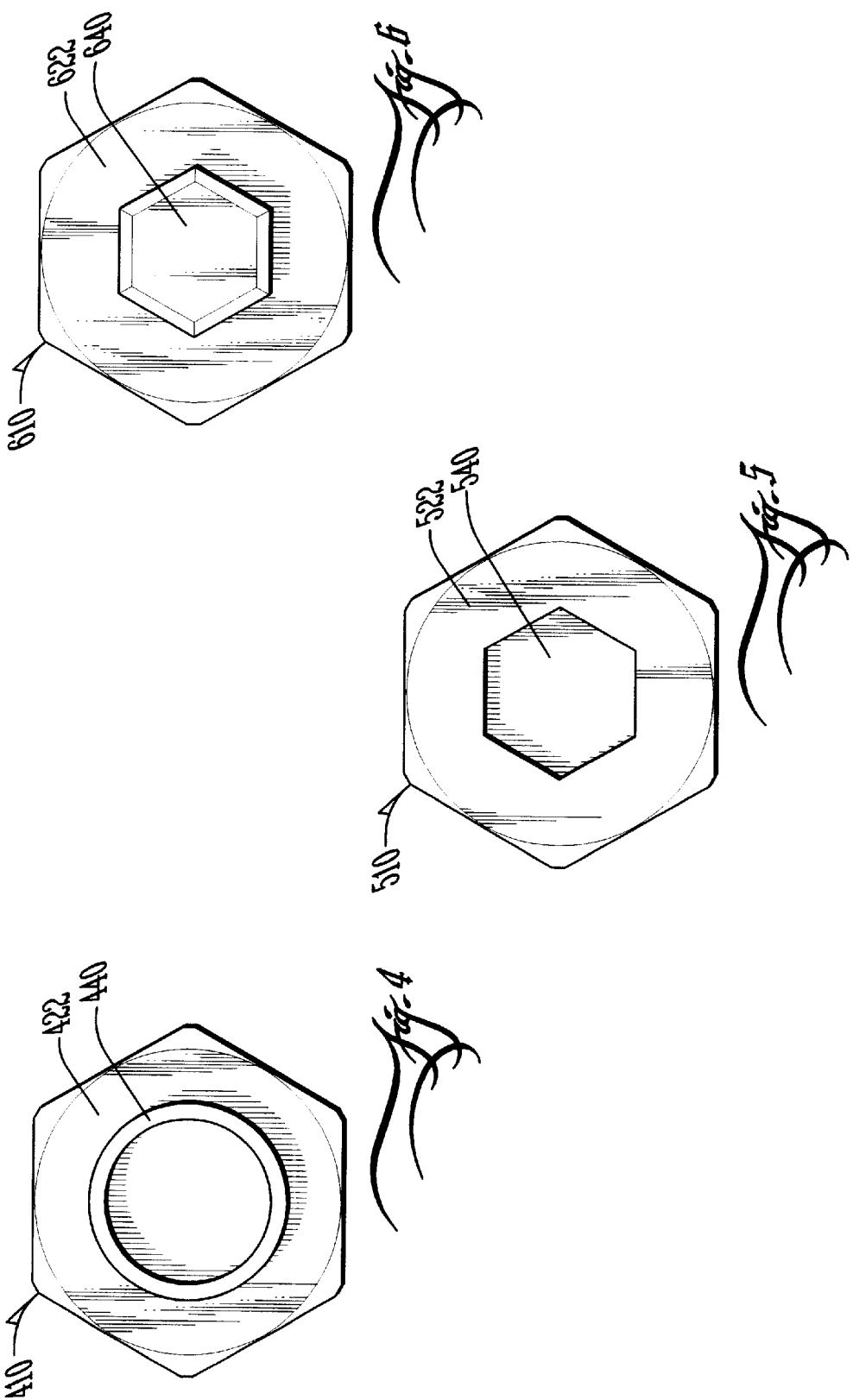

METHOD AND APPARATUS FOR PERFORMING REAR WHEEL ALIGNMENT ON MOTORCYCLES HAVING A SWING ARM REAR SUSPENSION SYSTEMS

FIELD OF THE INVENTION

The present invention relates to rear wheel alignment for motorcycles and more particularly relates to rear wheel alignment for motorcycles having a swing arm rear suspension system.

BACKGROUND OF THE INVENTION

For various different reasons, the rear wheel of a motorcycle can become misaligned. This misalignment is a relative mispositioning of the wheel with respect to other components of the motorcycle and can have several undesirable consequences. Misalignment can result in a degradation in the performance and riding comfort of the motorcycle, such as increased shaking or vibration during operation. Misalignment of the rear wheel can result in excessive tire wear, and if left uncorrected for extended periods of operation, excessive wear on the axles and other mechanical drive components.

In the past, motorcycle mechanics have employed a technique of measuring the distance from each side of the swing arm suspension bolt or pivoting shaft, a structurally significant member of the motorcycle, to the respective sides of the rear axle. This pivoting shaft is a component of a particular type of motorcycle with a pivoting swing arm rear suspension system. Often these motorcycles do not have any visible shock absorbers which extend from the swing arm upwardly to structural members of the frame. These motorcycle suspensions are often described by motorcycle owners and manufacturers, with several different ways, as "soft tails" or as having a "swing arm suspension." Typically, a motorcycle mechanic will first determine the exact center of the swing arm pivot shaft bolt by drawing two intersecting lines with care being given to each line so that it goes through the center of the bolt. Then the mechanic will use a long rod, such as a welding rod, and hold one end of such rod over the point of intersection of the two lines. A rubber grommet is placed over the rod and slid to mark the location of the center of the rear axle. Then this rod, with its properly positioned rubber grommet, is used on the other side of the motorcycle in a similar fashion. If the rear axles are the same distance from their respective swing arm pivot shaft bolts' center line, then no further adjustment to the pivot bolt-axle distance is required.

While this approach has been used extensively with considerable success in the past, it has several serious drawbacks. First of all, it is often time consuming to draw the lines on the swing arm pivoting bolt to determine the center of the bolt. Secondly, it is often difficult to hold one end of the measuring rod exactly over the pivot shaft bolt center point and simultaneously align the rubber grommet with the center of the rear axle.

Consequently, there is an existing need for improved methods and apparatuses for performing wheel alignments on motorcycles having a swing arm rear suspension system.

SUMMARY OF THE INVENTION

It is an object of the present invention to provide improved alignment of rear wheels on motorcycles having a swing arm suspension system.

It is a feature of the present invention to include a measuring rod and a measuring rod registration member.

It is an advantage of the present invention to aid motorcycle mechanics in holding the measuring rod at the center of the swing arm pivot bolt.

It is another advantage of the present invention to reduce the time required to perform rear wheel alignments for motorcycles having a swing arm suspension system.

It is another feature of the present invention to include a sharp pointed sliding measuring member on the measuring rod.

It is another advantage of the present invention to provide for increased ability to precisely measure the center of the rear axle bolt.

The present invention is an apparatus for performing rear wheel alignment on motorcycles having a swing arm suspension, which is designed to satisfy the aforementioned needs, provide the previously stated objects, include the above listed features and achieve the already articulated advantages. The present invention is carried out in a "registration error-less" manner in a sense that the errors associated with misalignment or misregistration of a measuring rod with a center point on a swing arm pivot shaft bolt are reduced.

Accordingly, the present invention includes a measuring rod having a swing arm end and a rear end and a measuring rod registration member, disposed at a central position on a swing arm pivot shaft bolt and further including a rear axle measurer, means for measuring a position associated with the rear axle.

BRIEF DESCRIPTION OF THE DRAWINGS

The invention may be more fully understood by reading the foregoing description of the preferred embodiments of the invention, in conjunction with the appended drawings wherein:

FIG. 1 is a side view of the measuring rod and measuring rod registration member of the present invention in association with a motorcycle having a swing arm rear suspension.

FIG. 2 is an exploded perspective view of the measuring rod and measuring rod registration member of the present invention in association with a swing arm pivot bolt.

FIG. 3 is a view of an opposite side of the measuring rod registration member of FIG. 2.

FIG. 4 is a top view of an alternate embodiment of the registration member of the present invention.

FIG. 5 is a top view of an alternate embodiment of the registration member of the present invention.

FIG. 6 is a top view of an alternate embodiment of the registration member of the present invention.

DETAILED DESCRIPTION

Now referring to the drawings, wherein like numerals refer to like matter throughout, and more particularly to FIG. 1, there is shown a motorcycle, generally designated 100, having a rear wheel 102 and a rear axle 104. Coupled to rear axle 104 is a rear wheel swing arm suspension system, which is coupled to a pivot shaft 108. Also shown is a nut cover 110 of the present invention, which is shown in an exploded view (where the dotted lines refer to the position of the items during normal use of the present invention). Nut cover 110 is shown having a recess 112 therein. A measuring rod 114 is shown extending from the center of the recess 112 in a rearwardly direction with a marker 116 placed thereon for marking the position of the axle 104.

The swing arm assembly is coupled to a main frame member 118 The motorcycle 100 is similar to a Harley-Davidson model generally known as a "soft tail"; however, any motorcycle of any manufacturer which utilizes a similar rear wheel swing arm suspension system is equally applicable. The swing arm assemblies 106 can be of varying types. They may have a relatively triangular shaped side view or a relatively straight side view.

In either configuration, the swing arm assembly has structure thereon for securely receiving a rear wheel assembly therein and further having a "pivoting" or "swinging" connection with respect to the main frame of the motorcycle.

Now referring to FIG. 2, there is shown an enlarged exploded view of an embodiment of the present invention in its intended environment. Shown is pivot shaft 108, which could also be called a swing arm shaft or various other names, having a free end surface 109 thereon. Pivot shaft 108 may be of the type that extends across the entire motorcycle, or it may be one of two pivot shaft bolts, with each one being located on opposite sides of the motorcycle. Pivot shaft free end surface 109 may be a bolt head integrally coupled with pivot shaft 108. Alternatively, the free end surface 109 may be a threaded nut disposed around shaft 108. Alternatively, free end surface 109 may be any end or cover device which might be coupled to or covering portions of shaft 108.

In one common configuration where two pivot bolts are used, an axis tube extends between the two pivot bolts and couples to them, much like an elongated nut having two opposite ends for receiving bolts. Various modifications to these configurations are common and well understood in the art. In either case, pivot shaft 108 is centrally disposed within a portion of the swing arm assembly 106 and the swing arm assembly 106 pivots or rotates around the pivot shaft 108 when differing forces are exerted on the rear wheel and the frame.

Also shown is nut cover 110 having an outside surface 222 and an inside edge 224. Nut cover 110 is shown by the dotted lines to be configured to be placed on or over free end surface 109. Nut cover 110 is shown having a recess 112 therein at a centrally disposed location.

Recess 112 is for receiving a tip 220 of measuring rod 114. Tip 220, in an alternate embodiment, may be removed and replaced with an opening 221 in rod 114. If tip 220 is replaced with an opening 221, then recess 112 may be replaced with a protuberance for cooperation with opening 221. Alternate embodiments of the present invention are shown in more detail and described in conjunction with FIGS. 4, 5, and 6. Nut cover 110 may be manufactured from any suitable material including plastic, metal, rubber, or the like. Alternatively, the present invention may include an embodiment in which no nut cover 110 is utilized, but the recess 112 (or protuberance in an alternate embodiment) is integrated directly with the free end surface 109.

Measuring rod 114 is preferably an elongated rigid or semi-rigid device, such as a welding rod or any other material. Additionally, measuring rod 114 may have various shapes and configurations. For example, measuring rod 114 could be a telescopic rod (similar to those frequently used for radio antennas) or a folding device with several sections (similar to a folding brick layer's rule or a rod which bends to avoid contact with intermediate portions of the motorcycle). Ideally, measuring rod 114 has sufficient length to accommodate use on several different models and types of motorcycles having swing arm rear suspension systems. A marker 116 is shown disposed over measuring rod 114. Marker 116 may be a pointed piece of plastic attached to or wrapped around measuring rod 114, which is capable of being slid along the rod 114 to mark the location of the rear axle 104 of the motorcycle 100. FIG. 1 shows marker 116 being directed to the center of the axle 104; however, marker 116 could be alternatively used to measure a distance to the front, rear, or other position of the axle 104. Marker 116 need not be a mechanically coupled device around measuring rod 114. It could be in fact integrally coupled with measuring rod 114 and may just be a series of markings on measuring rod 114. The details of marker 116, its composition, ability to move etc., are a matter of designers' choice; however, it is believed that a pointed slidable device disposed around rod 114 may be preferred.

Now referring to FIG. 3, there is shown a view of the nut cover 110 of FIGS. 1 and 2 from an opposite direction. Side 224 is shown in the foreground, while side 222 is now in the background of the drawing. Nut cover 110 is now more readily identifiable as a cap or cover, that might be placed over a bolt or nut. Cover 110 is shown having plurality of protuberances 226 disposed along internal edges. Protuberances 226 may be resilient in nature and provide for a snug fit of the nut cover 110 over the free end surface 109. Many different methods of manufacture of nut cover 110 are possible and are intended to be included in the present invention. The use of protuberances 226 is merely one example of many ways to provide a snug fit.

The nut cover 110 and free end surface 109 of FIGS. 1, 2, and 3, as well as the covers 410, 510, and 610 of FIGS. 4, 5, and 6, are not intended to depict any particular type of nut, bolt, etc. A five-sided, six-sided, eight-sided, square, rectangular, triangular, or circular bolt or nut are all envisioned. The precise shape of nut cover 110 is not critical and in fact, it need not necessarily match the shape of free end surface 109. However, it is desirable that nut cover 110 have a sufficiently snug fit with surface 109 so that there is no, or very little, displacement of the nut cover 110 during measuring operations. Of course, if the features of a recessed hole in the nut cover 110 or a protuberance on the nut cover 110 are directly incorporated onto the free end surface 109, then the "snug fit" is no longer appropriate because of the integral nature of that particular embodiment.

Now referring to FIG. 4, there is shown an alternate embodiment of the present invention, including a nut cover 410 having an exterior surface 422 and a raised ring area 440 disposed thereon.

Now referring to FIG. 5, there is shown an alternate embodiment of the present invention, including the nut cover 510 having an exterior surface 522 and a patterned recess 540 therein.

Now referring to FIG. 6, there is shown an alternate embodiment of the present invention, including a nut cover 610 having an exterior surface 622 and a patterned protuberance 640 thereon. Nut covers 410, 510, and 610 of FIGS. 4, 5, and 6 are similar in many respects to nut cover 110 of FIGS. 1, 2, and 3. Nut covers 410, 510, and 610 are in one embodiment directly placed over free end surface 109 and in alternate embodiments could be incorporated directly into the free end surface 109 by incorporating the distinctive features 440, 540, and 640 directly onto or into the surface 109.

In operation, and now referring to FIGS. 1 through 6, the method of use of the present invention is hereafter described. First of all, a motorcycle having a rear swing arm suspension system is provided, which has at least one pivot shaft 108 thereon. Pivot shaft 108 has a free end surface 109 thereon, which may receive a nut cover 110, 410, 510, or 610, or alternatively include the distinctive features of one or more of these nut covers. The nut covers 110, 410, 510, and 610 are placed over the free end surface 109, so that the recess 112, ring member 440, patterned recess 540, or a protuberance 640 are centrally disposed over free end surface 109. Measuring rod 114 then is mechanically coupled with nut covers 110, 410, 510, 610, or in the alternative, free end surface 109 incorporating such features. In FIG. 2, it is shown that the pointed end 220 of measuring rod 114 can be inserted into recess 112. There would then be contact between measuring rod 114 along line 218 with interior portions of the recess 112. Alternatively, if the pointed end 220 is replaced with a cavity 221, and the recess 112 is replaced with a protuberance which may be either conical shaped, or otherwise, such as a hexkey shape, etc., as suggested in FIG. 6 with protuberance 640, then the measuring rod 114 can be placed over the protuberance, and there will be contact along the edge of the protuberances with interior portions of the measuring rod 114. Once the measuring rod 114 is mechanically coupled with the nut covers 110, 410, 510, 610, (or an alternative free surface 109 with appropriate modifications), the mechanical coupling creates a condition of resistance to lateral motion of the measuring rod 114 about the surface 222, 422, 522, and 622 (or free end surface 109). This resistance is at least in part due to the contact along line 219 or alternatively inside a cavity 221 and, therefore, produces a resistance which is in a plane other than the plane of the surfaces 109, 222, 422, 522, or 622. This results in a more stabilized positioning of measuring rod 114. This registering of the rod at a predetermined position is helpful in making precise measurements. Once the rod 114 is mechanically coupled with nut covers 110, 410, 510, 610 or free end surface 109, then the measuring rod is positioned so that portions of it extend rearwardly to predetermined positions on the rear axle 104. The mechanic may either read the distance on markings ruled on the measuring rod 114 or may slide a marker 116 to create a marked position. Alternatively, other marking arrangements may be used, such as using a pen, pencil, marker, tag, sticker, etc., to mark a position on rod 114. Once the mechanic or motorcycle owner has performed these operations, and the distance from the pivot shaft 108 and rear axle 104 have been determined for one side of the motorcycle, the process can be repeated on the other side of the motorcycle in a similar fashion. If marker 116, or other marks are utilized, then the measurement on the other side can be done rather rapidly to confirm proper alignment or directions of misalignment of the rear wheel with respect to the pivot shaft 108.

It is thought that the method and apparatus of the present invention will be understood from the foregoing description, and it will be apparent that various changes may be made in the form, construction, steps and arrangement of the parts and steps thereof without departing from the spirit and scope of the invention or sacrificing all other material advantages, the form herein described being merely a preferred or exemplary embodiment thereof.

I claim:

1. A method for measuring the alignment of a motorcycle wheel comprising the steps of:
   providing a motorcycle having a swing arm rear suspension system, of the type having a swing arm pivot shaft therein;
   providing a measuring rod with a swing arm end and a rear end;
   said pivot shaft having a registration member coupled thereto for coupling with said measuring rod at a predetermined position with respect to a central position of said pivot shaft;
   mechanically coupling said measuring rod with said registration member, so that said rod has a predetermined relationship with said pivot shaft and said step of mechanically coupling further having a characteristic that displacement of said rod about a surfaced plane parallel to an end of said pivot shaft meets resistance by engagement of said rod and said registration member in a plane other than a plane parallel with said surface plane;
   positioning a marker on said rod to demark a distance from said pivot shaft to a position on a rear axle of said motorcycle.

2. A method of claim 1 wherein said registration member is an integral portion of said shaft.

3. A method of claim 1 wherein said registration member is an integral portion of a nut on said pivot shaft.

4. A method of claim 1 wherein said registration member is an integral portion of a cap placed over a portion of said shaft.

5. A method of claim 4 wherein said cap has a depression therein for receiving said rod therein.

6. A method of claim 4 wherein said cap has a protuberance thereon for insertion into a depression in said rod.

7. A method of claim 1 wherein said registration member is a depression for receiving said rod inserted therein.

8. A method of claim 1 wherein said registration member is a protuberance for insertion into a depression in said rod.

9. A method of claim 1 wherein said positioning a marker includes sliding a marker along said rod.

10. A swing arm rear suspension system of a motorcycle wherein the improvement comprises:
    a swing arm shaft;
    a swing arm coupled to a motorcycle, said swing arm having a void which is configured and adapted to receive the swing arm shaft;
    said shaft having a free end surface;
    means for registering a measuring rod with respect to a predetermined position on said shaft wherein said means for registering further providing means for mechanically resisting displacement of said measuring rod wherein said resistance is in a plane other than a plane parallel to said free end surface; and
    said measuring rod having a longitudinal axis which is substantially parallel with respect to a line drawn from said free end surface to an end of a rear axle of said motorcycle frame, said measuring rod used to measure a distance along said line.

11. A swing arm shaft of claim 10 wherein said free end surface is integrally coupled with said shaft.

12. A swing arm shaft of claim 11 wherein said means for registering includes a protuberance on said free end surface.

13. A swing arm shaft of claim 12 wherein said protuberance is disposed at a noncentral position on said free end surface.

14. A swing arm shaft of claim 10 wherein said free end surface is disposed on a nut detachably coupled with said shaft.

15. A swing arm shaft of claim 10 wherein said means for registering includes a depression in said free end surface.

16. A swing arm shaft of claim 10 wherein said means for registration includes a raised portion centrally disposed around a center of said free end surface.

17. A swing arm shaft of claim 10 wherein said means for registering includes a protuberance on said free end surface for insertion into a measuring rod.

18. A system for use in rear wheel alignments for a motorcycle having a swing arm rear suspension system, the system comprising:
    an elongated measuring rod having a swing arm end and a rear end and a longitudinal axis extending therebetween;
    a measuring rod registration member coupled to a pivot shaft disposed in said swing arm rear suspension system, said registration member for mechanically coupling with said rod; and,
    a slidable marker disposed on said rod for measuring a distance along said longitudinal axis from said pivot shaft to a rear axle of said motorcycle.

19. A system of claim 18 wherein said registration member is detachably coupled to an end of said pivot shaft.

20. A system of claim 19 wherein said registration member includes a depression therein for receiving said measuring rod.

* * * * *